(12) United States Patent
Lin et al.

(10) Patent No.: US 11,128,868 B2
(45) Date of Patent: Sep. 21, 2021

(54) METHOD AND APPARATUS OF MATRIX-BASED INTRA PREDICTION FOR VIDEO CODING

(71) Applicant: MEDIATEK INC., Hsinchu (TW)

(72) Inventors: Zhi-Yi Lin, Hsinchu (TW); Tzu-Der Chuang, Hsinchu (TW); Ching-Yeh Chen, Hsinchu (TW); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/895,073

(22) Filed: Jun. 8, 2020

(65) Prior Publication Data

US 2020/0396459 A1    Dec. 17, 2020

Related U.S. Application Data

(60) Provisional application No. 62/859,774, filed on Jun. 11, 2019.

(51) Int. Cl.

| | |
|---|---|
| *H04N 19/132* | (2014.01) |
| *H04N 19/105* | (2014.01) |
| *G06F 17/16* | (2006.01) |
| *H04N 19/159* | (2014.01) |
| *H04N 19/176* | (2014.01) |

(52) U.S. Cl.
CPC ........... *H04N 19/132* (2014.11); *G06F 17/16* (2013.01); *H04N 19/105* (2014.11); *H04N 19/159* (2014.11); *H04N 19/176* (2014.11)

(58) Field of Classification Search
CPC .. H04N 19/132; H04N 19/105; H04N 19/176; H04N 19/159; H04N 19/593; H04N 19/60; H04N 19/11; G06F 17/16
See application file for complete search history.

(56) References Cited

U.S. PATENT DOCUMENTS 10,951,884 B2 * 3/2021 Moon .................... H04N 19/44

FOREIGN PATENT DOCUMENTS

WO    WO-2020207492 A1 * 10/2020 ........... H04N 19/107

* cited by examiner

*Primary Examiner* — Joseph W Becker
(74) *Attorney, Agent, or Firm* — McClure, Qualey & Rodack, LLP

(57) ABSTRACT

Method and apparatus of video coding are disclosed. According to one method, the left reference boundary samples and the top reference boundary samples are checked jointly. According to another method, selected original left reference boundary samples and selected original top reference boundary samples at specific positions are used for predictor up-sampling. According to yet another method, the horizontal interpolation and the vertical interpolation are in a fixed order regardless of a shape of the current block, size of the current block or both.

3 Claims, 4 Drawing Sheets

METHOD AND APPARATUS OF MATRIX-BASED INTRA PREDICTION FOR VIDEO CODING

CROSS REFERENCE TO RELATED APPLICATIONS

The present invention claims priority to U.S. Provisional Patent Application Ser. No. 62/859,774, filed on Jun. 11, 2019. The U.S. Provisional Patent Application is hereby incorporated by reference in its entirety.

FIELD OF THE INVENTION

The present invention relates to Intra prediction for video coding. In particular, the present invention relates to simplification of Matrix-based Intra prediction mode and unification of the Matrix-based Intra prediction mode and conventional Intra prediction mode.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each picture can be partitioned into multiple CTUs (Coding Tree Units) and each CTU is partitioned one or more CUs. For color video data, each CU may comprise multiple Coding Blocks (CBs) corresponding to multiple color components. Each CU contains one or multiple prediction units (PUs). For color video data, each PU may comprise multiple Prediction Blocks (PBs) corresponding to multiple color components. To achieve the best coding efficiency of hybrid coding architecture in HEVC, there are two kinds of prediction modes (i.e., Intra prediction and Inter prediction) for each PU. For Intra prediction modes, the spatial neighboring reconstructed pixels can be used to generate the directional predictions.

After the development of HEVC standard, another merging video coding standard, named as Versatile Video Coding (VVC), is being developed under Joint Video Exploration Team (JVET) of ITU-T SG 16 WP 3 and ISO/IEC JTC 1/SC 29/WG 11. Various new coding tools along with some existing coding tools have been evaluated for VVC.

Like many video coding systems, the HEVC and VVC use adaptive Inter prediction and Intra prediction. For the Intra prediction mode, HEVC uses DC mode, planar mode, and 33 directional modes. The directional prediction modes are also referred as angular prediction modes. On the other hand, the VVC uses 67 Intra prediction modes including DC mode, planar mode and 65 directional Intra prediction modes.

A new type of Intra prediction, called Matrix-based Intra Prediction (MIP) has been introduced in JVET-N0217 (J. Pfaff et al., "CE3: Affine linear weighted intra prediction (CE3-4.1, CE3-4.2)", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0217). While MIP has shown to improve coding performance, it also results in increased system complexity. Therefore, it is desirable to develop techniques to simplify the system complexity for coding systems incorporating MIP.

BRIEF SUMMARY OF THE INVENTION

A method and apparatus of video coding are disclosed. According to this method, input data related to a current block in a current picture are received at a video encoder side or a video bitstream comprising coded data of the current block is received at a video decoder side. When the MIP mode is applied to the current block: availability for a target reference boundary region comprising left reference boundary samples and top reference boundary samples is checked, wherein the left reference boundary samples and the top reference boundary samples are checked jointly for the current block; a reduced predictor is derived, wherein the deriving process comprises applying matrix multiplication on a boundary vector and adding an offset, and wherein the boundary vector is derived from the target reference boundary region, and wherein at least one unavailable samples is padded if there exists any unavailable sample in the target reference boundary region; and the current block is encoded or decoded using a MIP predictor derived from the reduced predictor.

In one embodiment, the availability for the target reference boundary region is checked from a bottom sample to a top sample of the left reference boundary samples, then a top-left corner reference sample, and then from a leftmost sample to a rightmost sample of the top reference boundary samples. In one embodiment, if all reference samples in the target reference boundary region are not available, the target reference boundary region is padded with a default value. In one embodiment, if there exist at least one available sample and at least one unavailable sample in the target reference boundary region, any unavailable sample prior to a firstly available sample is padded using the firstly available sample. Furthermore, a target unavailable sample after the firstly available sample is padded using a last available sample checked prior to the target unavailable sample. In one embodiment, the MIP predictor is derived by applying transpose, up-sampling or both to the reduced predictor.

According to another method, target samples are derived from a target reference boundary region comprising left reference boundary samples and top reference boundary samples. A reduced predictor is derived, wherein the deriving process comprises applying matrix multiplication on a boundary vector and adding an offset, and wherein the boundary vector is derived from the target reference boundary region. If current block size is larger than reduced predictor size: an up-sampled reduced predictor having the current block size is derived by applying horizontal and vertical bi-linear interpolation to the reduced predictor and selected original left reference boundary samples and selected original top reference boundary samples at specific positions; and the current block is encoded or decoded using the up-sampled reduced predictor. In one embodiment, the specific positions are dependent on width and height of the current block, length of the up-sampled the reduced predictor or both.

According to yet another method, a target reference boundary region comprising left reference boundary samples and top reference boundary samples is determined. A reduced predictor is derived, wherein the deriving process comprises applying matrix multiplication on a boundary vector and adding an offset, and wherein the boundary vector is derived from the target reference boundary region. The reduced predictor is up-sampled to a same size as the current block using horizontal interpolation and vertical interpolation if the reduced predictor is smaller than the current block, wherein the horizontal interpolation and the vertical interpolation are in a fixed order regardless of a shape of the current block, size of the current block or both. The current block is encoded or decoded using the up-sampled reduced predictor In one embodiment, the horizontal interpolation is always applied before the vertical interpolation. In another embodiment, the vertical interpolation is always applied before the horizontal interpolation.

DETAILED DESCRIPTION OF THE INVENTION

Figure 1:
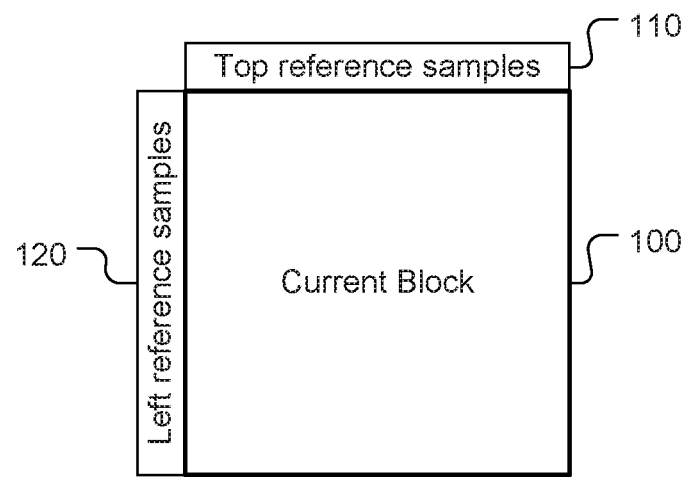
FIG. 1 illustrates an example of top reference samples and left reference samples that are used to derive matrix-based Intra predictor.

The following description is of the best-contemplated mode of carrying out the invention. This description is made for the purpose of illustrating the general principles of the invention and should not be taken in a limiting sense. The scope of the invention is best determined by reference to the appended claims.

Matrix-based Intra Prediction (MIP)

The MIP is disclosed in JVET-N0217 and it was adopted by VVC Test Model 5.0, VTM-5.0 (J. Chen, et al., "Algorithm description for Versatile Video Coding and Test Model 5 (VTM 5)", Joint Video Experts Team (WET) of ITU-T SG 16 WP 3 and ISO/IEC JTC 1/SC 29/WG 11, 14th Meeting: Geneva, CH, 19-27 Mar. 2019, Document: JVET-N1002). For predicting the samples of a rectangular block of width W and height H, MIP takes one line of H reconstructed neighboring boundary samples located at the left side of the block and one line of W reconstructed neighboring boundary samples located above the block as input.

The generation of the prediction signal is based on the following three steps:
1. Derivation of the boundary samples: four samples in the case of W=H=4 and eight samples in all other cases are extracted by averaging the neighboring reference samples.
2. A matrix vector multiplication, followed by addition of an offset, is carried out with the averaged samples as an input. The result is a reduced prediction signal corresponding to a subsampled set of samples in the original block.
3. The prediction signal at the remaining positions is generated from the prediction signal corresponding to the subsampled set using linear interpolation, which is a single-step linear interpolation in each direction.

The matrices and offset vectors needed to generate the prediction signal are taken from three sets of matrices ($S_0$, $S_1$, $S_2$). Set $S_0$ consists of 18 matrices, $A_0^i$, $i \in \{0, \ldots, 17\}$ and 18 offset vectors $b_0^i$, $i \in \{0, \ldots, 17\}$. Each of the matrices has 16 rows and 4 columns and each of vectors has a size of 16. Matrices and offset vectors of set $S_0$ are used for blocks of size 4×4. Set $S_1$ consists of 10 matrices, $A_1^i$, $i \in \{0, \ldots, 9\}$ and 10 offset vectors, $b_1^i$, $i \in \{0, \ldots, 9\}$. Each of the matrices has 16 rows and 8 columns and each of vectors has a size of 16. Matrices and offset vectors of set $S_1$ are used for blocks of sizes 4×8, 8×4 and 8×8. Finally, set $S_2$ consists of 6 matrices, $A_2^i$, $i \in \{0, \ldots, 5\}$ and 6 offset vectors $b_2^i$, $i \in \{0, \ldots, 5\}$. Each of matrices has 64 rows and 8 columns and each of vectors has a size of 64. Matrices and offset vectors of set $S_2$ or parts of these matrices and offset vectors are used for all other block-shapes.

The total number of multiplications needed in the computation of the matrix vector product is always smaller than or equal to 4×W×H. In other words, at most four multiplications per sample are required for the MIP modes. Detailed conventional MIP prediction derivation is described as follows.

I. Averaging of the Boundary

In a first step, the input boundaries $bdry^{top}$ (110) and $bdry^{left}$ (120) for a current block (100) are reduced to smaller boundaries $bdry_{red}^{top}$ and $bdry_{red}^{left}$ as shown in FIG. 1. Here, $bdry_{red}^{top}$ and $bdry_{red}^{left}$ both consist of 2 samples in the case of a 4×4 block and both consist of 4 samples in all other cases.

If the block size is 4×4, for $0 \leq i < 2$, the top reduced boundaries are defined as:

$$bdry_{red}^{top}[i] = \left(\left(\sum_{j=0}^{1} bdry^{top}[i \cdot 2 + j]\right) + 1\right) >> 1.$$

The left reduced boundaries, $bdry_{red}^{left}$ can be defined similarly.

Otherwise, if the block width W is given as $W = 4 \cdot 2^k$, for $0 \leq i < 4$, the top reduced boundaries are defined as:

$$bdry_{red}^{top}[i] = \left(\left(\sum_{j=0}^{2^k-1} bdry^{top}[i \cdot 2^k + j]\right) + (1 << (k-1))\right) >> k.$$

The left reduced boundaries, $bdry_{red}^{left}$ can be defined similarly.

The two reduced boundaries $bdry_{red}^{top}$ and $bdry_{red}^{left}$ are concatenated to a reduced boundary vector $bdry_{red}$ which is thus of size four for blocks of shape 4×4 and of size eight for blocks of all other shapes. If mode refers to the MIP mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for max}(W, H) = 8 \text{ and mode} < 10 \\ [bdry_{red}^{left}, bdry_{red}^{top}] & \text{for max}(W, H) = 8 \text{ and mode} \geq 10 \\ [bdry_{red}^{top}, bdry_{red}^{left}] & \text{for max}(W, H) > 8 \text{ and mode} < 6 \\ [bdry_{red}^{left}, bdry_{red}^{top}] & \text{for max}(W, H) > 8 \text{ and mode} \geq 6 \end{cases}$$

Finally, for large blocks, the subsampled prediction signal is interpolated using a second version of the averaged boundary. Namely, if min(W, H)>8 and W≥H, and where $W=8*2^l$, the top boundaries are derived for 0≤i<8 according to:

$$bdry_{redII}^{top}[i] = \left(\left(\sum_{j=0}^{2^l-1} bdry^{top}[i \cdot 2^l + j]\right) + (1 << (l-1))\right) >> l.$$

If min(W, H)>8 and H>W, the left reduced boundaries, $bdry_{red}^{left}$ can be defined similarly.

II. Generation of the Reduced Prediction Signal by Matrix Vector Multiplication

A reduced prediction signal $pred_{red}$ is generated based on the reduced input vector $bdry_{red}$. The reduced prediction signal corresponds to the down-sampled block of width $W_{red}$ and height $H_{red}$. Here, $W_{red}$ and $H_{red}$ are defined as:

$$W_{red} = \begin{cases} 4 & \text{for max}(W, H) \leq 8 \\ \min(W, 8) & \text{for max}(W, H) > 8 \end{cases},$$

$$H_{red} = \begin{cases} 4 & \text{for max}(W, H) \leq 8 \\ \min(H, 8) & \text{for max}(W, H) > 8 \end{cases}.$$

The reduced prediction signal $pred_{red}$ is computed by calculating a matrix vector product and adding an offset:

$pred_{red} = A \cdot bdry_{red} + b.$

In the above equation, A is a matrix with $W_{red} \times H_{red}$ rows and 4 columns for W=H=4, and 8 columns for all other cases. b is a vector of size $W_{red} \times H_{red}$.

The matrix A and the vector b are taken from one of the sets $S_0$, $S_1$, $S_2$ as follows. An index idx=idx(W, H) is defined as follows:

$$idx(W, H) = \begin{cases} 0 & \text{for } W = H = 4 \\ 1 & \text{for max}(W, H) = 8 \\ 2 & \text{for max}(W, H) > 8 \end{cases}.$$

Moreover, a parameter m is defined as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for max}(W, H) = 8 \text{ and mode} < 10 \\ \text{mode} - 9 & \text{for max}(W, H) = 8 \text{ and mode} \geq 10 \\ \text{mode} & \text{for max}(W, H) > 8 \text{ and mode} < 6 \\ \text{mode} - 5 & \text{for max}(W, H) > 8 \text{ and mode} \geq 6 \end{cases}.$$

Then, if idx≤1, or idx=2 and min(W, H)>4, A is set as $A=A_{idx}^m$ and b is set as $b=b_{idx}^m$. In the case that idx=2 and min(W, H)=4, A is set to be the matrix that arises by leaving out every other row of $A_{idx}^m$ in the case W=4, and A corresponds to an odd x-coordinate in the down-sampled block. In the case of H=4, A corresponds to an odd y-coordinate in the down-sampled block.

Finally, the reduced prediction signal is replaced by its transpose in the following cases:

W=H=4 and mode≥18 max(W, H)=8 and mode≥10 max(W, H)>8 and mode≥6

The number of multiplications required for calculation of $pred_{red}$ is 4 in the case of W=H=4 since A has 4 columns and 16 rows in this case. In all other cases, A has 8 columns and $W_{red} \times H_{red}$ rows. It can be verified that $8 \times W_{red} \times H_{red} \leq 4 \times W \times H$ multiplications are required in these cases. In other words, at most 4 multiplications per sample are needed to compute $pred_{red}$ in these cases.

Single Step Linear Interpolation

For a W×H block with max(W, H)≥8, the prediction signal is derived from the reduced prediction signal $pred_{red}$ with a block size $W_{red} \times H_{red}$ by linear interpolation. Depending on the block shape, linear interpolation is done in vertical, horizontal or both directions. If linear interpolation is to be applied in both directions, it is first applied in horizontal direction if W<H, and it is first applied in vertical direction, otherwise.

Consider, without loss of generality, the case for a W×H block with max(W, H)≥8 and W≥H. Then, the one-dimensional linear interpolation is performed as follows. Without loss of generality, it suffices to describe linear interpolation in vertical direction. First, the reduced prediction signal is extended to the top using the boundary signal. The vertical up-sampling factor $U_{ver}$ is defined as $U_{ver}=H/H_{red}$ and is further represented as $U_{ver}=2^{u_{ver}}>1$. The extended reduced prediction signal is defined by:

$$pred_{red}[x][-1] = \begin{cases} bdry_{red}^{top}[x] & \text{for } W = 8 \\ bdry_{redII}^{top}[x] & \text{for } W > 8 \end{cases}.$$

As shown in the above equation, the reduced boundary samples are also used as the extended reduced prediction signal and then, from this extended reduced prediction signal, the vertically linear interpolated prediction signal is generated as:

$$pred_{red}^{ups,ver}[x][U_{ver} \cdot y + k] = \left((U_{ver} - k - 1) \cdot pred_{red}[x][y-1] + (k+1) \cdot pred_{red}[x][y] + \frac{U_{rev}}{2}\right) >> u_{ver}$$

for $0 \leq x < W_{red}, 0 \leq y < H_{red}$ and $0 \leq k < U_{ver}$.

Proposed Method 1—Boundary Reference Sample Derivation

In the JVET-N0217, the availability checks of the reference samples along the left boundary and top boundary are checked separately. The checks of the left boundary samples are done from top to bottom, and the checks of the top boundary samples are done from left to right. For the left reference boundary samples, if all of them are not available, a default value will be used to fill the left reference boundary samples. For the top boundary reference samples, if all of them are not available, a default value will be used to fill the top reference boundary samples.

For both left and top boundary reference samples, if they are partially available, the unavailable samples will be padded using the last available sample checked before.

Figure 2:
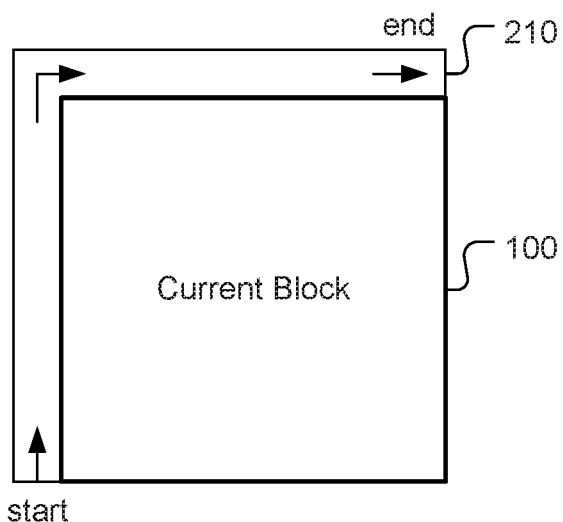
FIG. 2 illustrates an example of reference boundary samples that are used to derive matrix-based Intra predictor according to one embodiment of the present invention.

The conventional MIP uses different availability checking and padding of unavailable samples from the regular Intra prediction. In order to simplify system complexity, a method to harmonize the availability checks and reference sample padding process between the regular Intra prediction mode and the MIP mode is disclosed. For example, the availability of the left and top boundary reference samples can be checked together according to the present invention. All of the top boundary and left boundary reference samples will be checked one by one. In one embodiment, the checking order is the left boundary reference samples (from the bottom sample to the top sample) first, then the top-left corner sample, and then the top boundary reference samples (from the leftmost sample to the rightmost sample) as shown in FIG. 2. In the example of FIG. 2, the reference boundary samples 210 include the left boundary samples, the top-left corner sample and the top boundary samples.

If all of the reference samples are not available, a default value will be used to fill the left reference boundary samples, top-left corner sample, and the top reference boundary samples; otherwise, the reference samples checked before the first available sample will be padded using the first available sample. For other unavailable samples, they will be padded with the last available sample checked prior to a current unavailable sample.

Proposed Method 2—Reference Sample Derivation for Up-Sampling

In NET-0217, if the size of the reference samples of the left/top boundary for predictor up-sampling is not equal to the height/width of the current block, the left/top boundary reference samples will be down-sampled to the target size (for predictor up-sampling). And then, if the size of the left/top boundary for matrix multiplication is not equal to the size of the left/top boundary for predictor up-sampling, the left/top boundary reference samples for predictor up-sampling will be further down-sampled to the target size (for matrix multiplication). Therefore, in the worst case, there will be two-stage down-sampling during preparing the boundary reference samples for a MIP coded block.

In the proposed method, the reference samples used for predictor up-sampling corresponds to the original reference sample in specific positions. Therefore, there is no need to apply down-sampling when preparing the reference boundary samples for predictor to be up-sampled. In one embodiment, the position depends on the scaling factor between the width/height of the current block and the length (e.g. upSamplingSize) for predictor up-sampling at top/left boundary. The scaling factor is equal to block_width/upSampling_top for top boundary, and equal to block_height/upSampling_left for left boundary. For both boundaries, the index of the reference samples for predictor up-sampling is equal to scalingFactor*(i+1)−1, where i=0 . . . upSamplingSize−1. In other words, for X equal to Top or Left and i=0 . . . upSamplingSize−1:

upSampling_ref_$X[i]$=org_ref_$X$[scalingFactor*$(i+1)$−1].

Proposed Method 3—Reference Sample for Matrix Multiplication

In one embodiment, the reference samples for matrix multiplication are original samples instead of samples derived by down-sampling the boundary reference samples.

The reference samples for matrix multiplication correspond to the original reference sample in specific positions according to the embodiment. There is no need to apply down-sampling when preparing the reference boundary samples for matrix multiplication. In one embodiment, the position depends on the scaling factor between the width/height of the current block and the length (e.g. matrixMultSize) for matrix multiplication at top/left boundary. The scaling factor is equal to block_width/matrixMult_top for the top boundary, and equal to block_height/matrixMult_left for the left boundary. For both boundaries, the index of the reference samples for predictor up-sampling is equal to scalingFactor*(i+1)−1, where i=0 . . . matrixMultSize−1.

In other words, for X equal to Top or Left nd i=0 . . . matrixMultSize−1:

matrixMult_ref_$X[i]$=org_ref_$X$[scalingFactor*$(i+1)$−1].

Proposed Method 4—Combination of Method 3 and Method 2

After combining Method 3 and Method 2, the down-sampling process can be remove from the MIP mode. Both the reference samples for predictor up-sampling and matrix multiplication are derived using the original reference samples.

In one embodiment, a smoothing filter is first applied to the boundary reference samples. In one embodiment, the filter is a filter with [1 2 1] coefficients.

Proposed Method 5—Fixed Order Up-Sampling

In JVET-N0217, the 1D up-sampling is applied to the shorter side first. For example, if the block_width is less than the block_height, horizontal up-sampling is applied first; otherwise, the vertical up-sampling is applied first.

In the proposed method, the order of the up-sampling is fixed. In one embodiment, horizontal up-sampling is always applied first. In another embodiment, vertical up-sampling is always applied first.

Proposed Method 6—MPM Derivation

In JVET-N0217, for blocks using regular Intra prediction mode, if the neighboring block is MIP coded, the MIP mode index will be mapped to a regular Intra mode index. Similarly, for chroma Intra blocks, if the referenced luma block is MIP coded, the MIP mode index will be mapped to a regular Intra mode index. For blocks using MIP mode, if the referenced block is a regular Intra mode index, the regular Intra mode index will be mapped to a MIP mode index. If the neighboring block is MIP mode, and the MipSizeId of the current block and neighboring block are not the same, then the reference Intra prediction mode is unavailable. Otherwise, the reference Intra prediction mode index is equal to the MIP mode index of the neighboring block. The MipSizeId is derived according to the width and height of the block.

In the proposed method, all Intra modes are mapped to the regular Intra mode index and stored for referencing by other blocks. In other words, for blocks coded in Intra prediction mode or for chroma Intra blocks, the reference luma Intra prediction mode index is always a regular Intra mode index. If the current block is MIP coded, the referenced regular Intra prediction mode will be mapped to a MIP mode index.

In one embodiment, the MPM list derivation of a MIP coded block is first derived using the regular Intra prediction mode, and then mapped the mode indexes of all the MPM candidates into MIP mode indexes in the final stage.

In another embodiment, the referenced regular Intra prediction mode is first mapped to a MIP mode index, and then the MPM list is derived using the MIP mode index.

In another embodiment, the MPM list of the MIP mode is a subset of the s MPM list of the regular Intra mode, and all of the candidates in the subset will be mapped to MIP mode indexes when adding them into MPM list of the MIP mode.

Any of the foregoing proposed methods can be implemented in encoders and/or decoders. For example, any of the proposed methods can be implemented in an Intra-prediction module of an encoder, and/or an Intra-prediction module of a decoder. Alternatively, any of the proposed methods can be implemented as a circuit coupled to the Intra-prediction module of the encoder and/or the Intra-prediction module of the decoder, so as to provide the information needed by the reshape module or the residual scaling/reshape module.

Video encoders have to follow the foregoing syntax design so as to generate the legal bitstream, and video decoders are able to decode the bitstream correctly only if the parsing process is complied with the foregoing syntax design. When the syntax is skipped in the bitstream, encoders and decoders should set the syntax value as the inferred value to guarantee the encoding and decoding results are matched.

Figure 3:
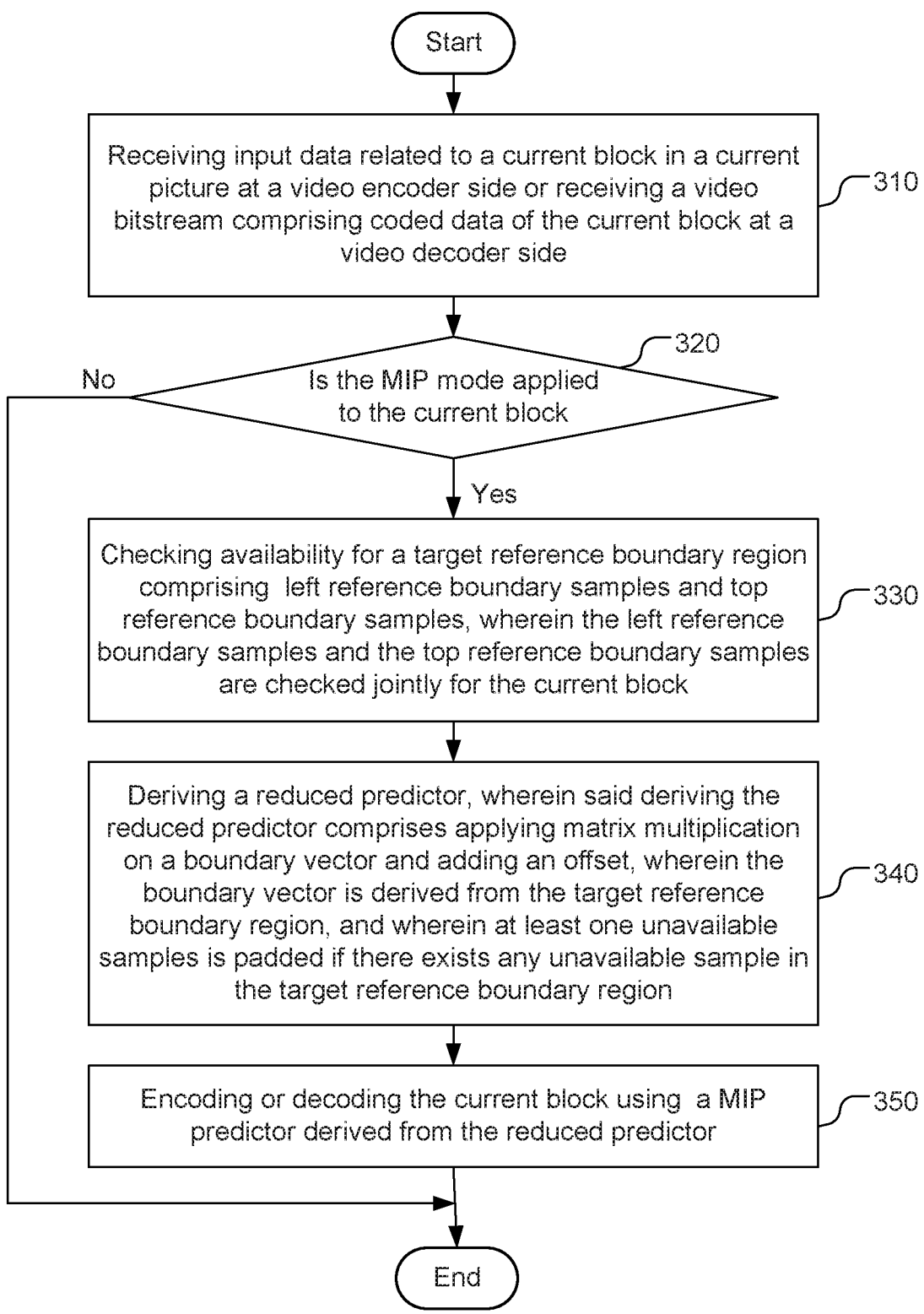
FIG. 3 illustrates a flowchart of an exemplary video coding using matrix-based Intra prediction according to an embodiment of the present invention, where the left reference boundary samples and the top reference boundary samples are checked jointly.

FIG. 3 illustrates a flowchart of an exemplary video coding using matrix-based Intra prediction according to an embodiment of the present invention, where the left reference boundary samples and the top reference boundary samples are checked jointly. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including a current luma block in a current picture is received at a video decoder side in step 310. Whether the MIP mode is applied to the current block is checked in step 320. If the MIP mode is applied to the current block (i.e., the "Yes" path from step 320), steps 330 through 350 are performed. Otherwise (i.e., the "No" path from step 320), steps 330 through 350 are skipped. In step 330, the availability for a target reference boundary region comprising left reference boundary samples and top reference boundary samples is checked, wherein the left reference boundary samples and the top reference boundary samples are checked jointly for the current block. In step 340, a reduced predictor is derived, wherein said deriving the reduced predictor comprises applying matrix multiplication on a boundary vector and adding an offset, wherein the boundary vector is derived from the target reference boundary region, and wherein at least one unavailable samples is padded if there exists any unavailable sample in the target reference boundary region. In step 350, the current block is encoded or decoded using a MIP predictor derived from the reduced predictor.

Figure 4:
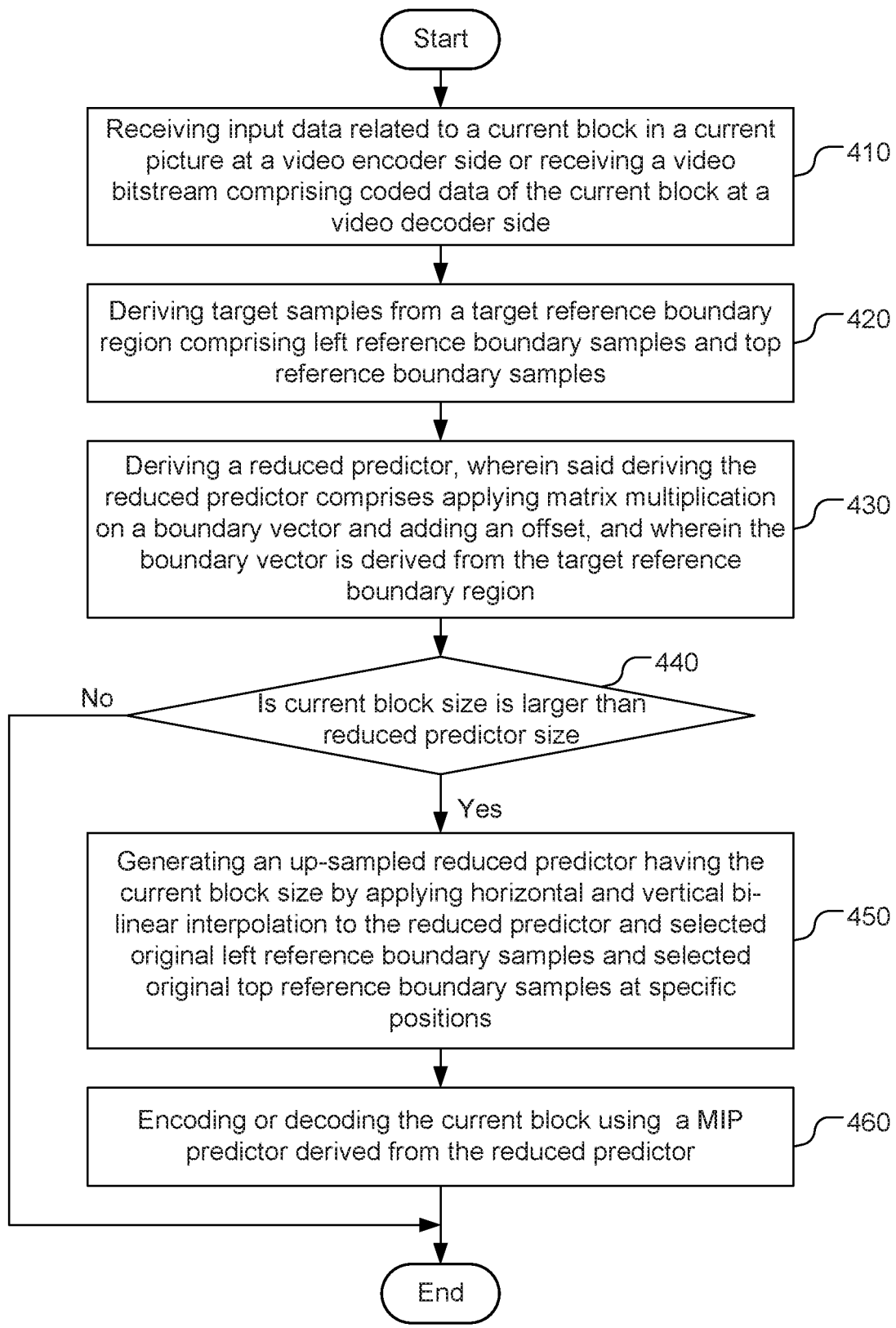
FIG. 4 illustrates a flowchart of an exemplary video coding using matrix-based Intra prediction according to an embodiment of the present invention, where selected original left reference boundary samples and selected original top reference boundary samples at specific positions are used for predictor up-sampling.

FIG. 4 illustrates a flowchart of an exemplary video coding using matrix-based Intra prediction according to an embodiment of the present invention, where selected original left reference boundary samples and selected original top reference boundary samples at specific positions are used for predictor up-sampling. According to this method, input data related to a current block in a current picture are received at a video encoder side or a video bitstream corresponding to compressed data including a current luma block in a current picture is received at a video decoder side in step 410. Target samples are derived from a target reference boundary region comprising left reference boundary samples and top reference boundary samples in step 420. A reduced predictor is derived in step 430, wherein said deriving the reduced predictor comprises applying matrix multiplication on a boundary vector and adding an offset, and wherein the boundary vector is derived from the target reference boundary region. Whether current block size is larger than reduced predictor size is checked in step 440. If the current block size is larger than the reduced predictor size (i.e., the "Yes" path from step 440), steps 450 and 460 are performed. Otherwise (i.e., the "No" path from step 440), steps 450 through 460 are skipped. In step 450, an up-sampled reduced predictor having the current block size is generated by applying horizontal and vertical bi-linear interpolation to the reduced predictor and selected original left reference boundary samples and selected original top reference boundary samples at specific positions. In step 460, the current block is encoded or decoded using a MIP predictor derived from the reduced predictor.

Figure 5:
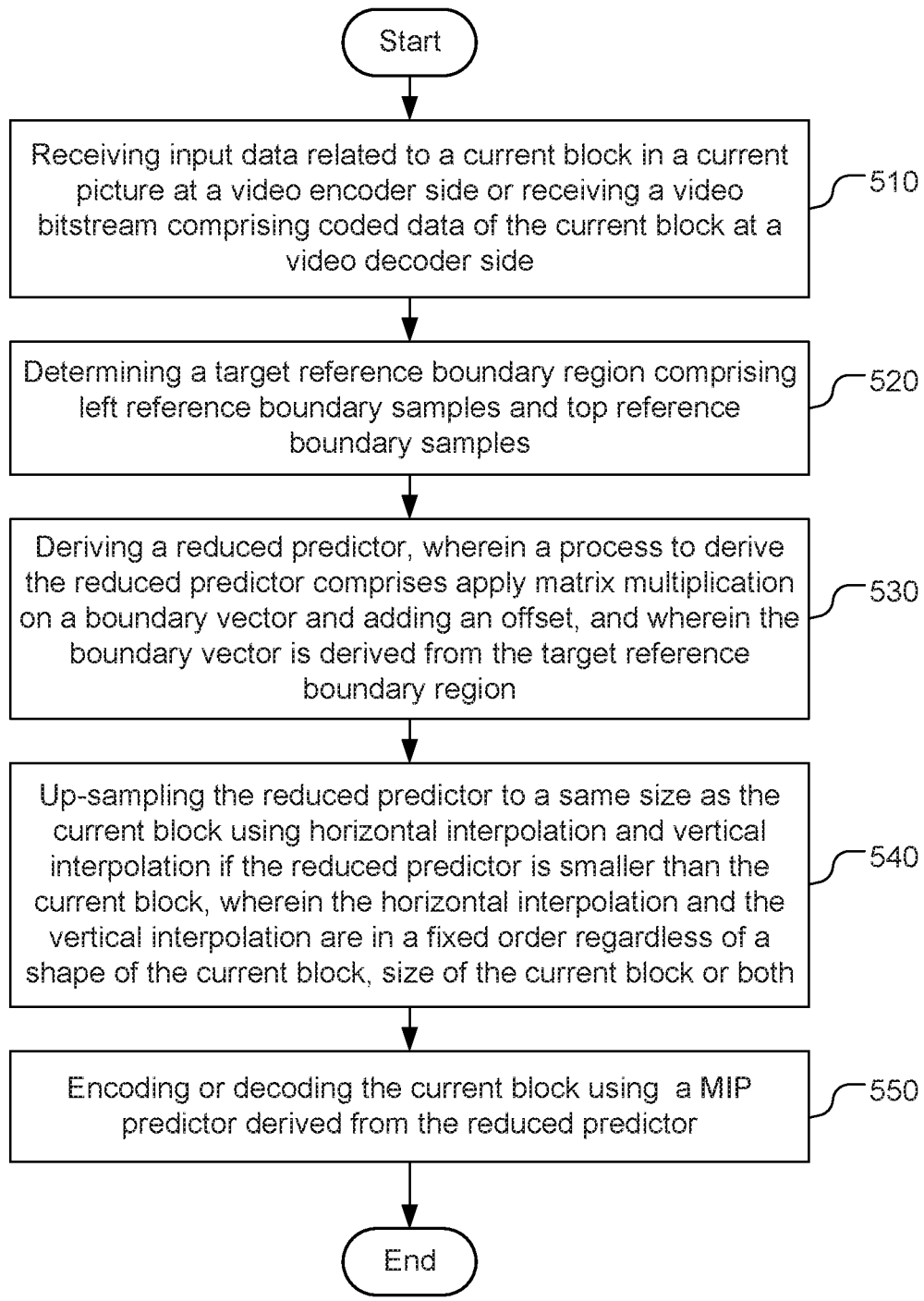
FIG. 5 illustrates a flowchart of an exemplary video coding using matrix-based Intra prediction according to an embodiment of the present invention, where the horizontal interpolation and the vertical interpolation are in a fixed order regardless of a shape of the current block, size of the current block or both.

FIG. 5 illustrates a flowchart of an exemplary video coding using matrix-based Intra prediction according to an embodiment of the present invention, where the horizontal interpolation and the vertical interpolation are in a fixed order regardless of a shape of the current block, size of the current block or both. According to this method, input data related to a current block in a current picture are received at a video encoder side or a video bitstream corresponding to compressed data including a current luma block in a current picture is received at a video decoder side in step 510. A target reference boundary region comprising left reference boundary samples and top reference boundary samples is determined in step 520. A reduced predictor is derived in step 530, wherein a process to derive the reduced predictor comprises apply matrix multiplication on a boundary vector and adding an offset, and wherein the boundary vector is derived from the target reference boundary region. The reduced predictor is up-sampled to a same size as the current block using horizontal interpolation and vertical interpolation if the reduced predictor is smaller than the current block in step 540, wherein the horizontal interpolation and the vertical interpolation are in a fixed order regardless of a shape of the current block, size of the current block or both. In step 550, the current block is encoded or decoded using a MIP predictor derived from the reduced predictor.

The flowcharts shown are intended to illustrate examples of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
   receiving input data related to a current block in a current picture at a video encoder side or receiving a video bitstream comprising coded data of the current block at a video decoder side;
   deriving a target reference boundary region comprising left reference boundary samples and top reference boundary samples;
   deriving a reduced predictor, wherein said deriving the reduced predictor comprises applying matrix multiplication on a boundary vector and adding an offset, and wherein the boundary vector is derived from the target reference boundary region; and
   if current block size is larger than reduced predictor size:
   generating an up-sampled reduced predictor having the current block size by applying horizontal and vertical bi-linear interpolation to the reduced predictor and selected left reference boundary samples and selected top reference boundary samples at specific positions; and
   encoding or decoding the current block using the up-sampled reduced predictor.

2. The method of claim 1, wherein the specific positions are dependent on width and height of the current block, length of the up-sampled the reduced predictor or both.

3. An apparatus of video coding, the apparatus of video coding comprising one or more electronic circuits or processors arranged to:
   receive input data related to a current block in a current picture at a video encoder side or receive a video bitstream comprising coded data of the current block at a video decoder side;
   derive a target reference boundary region comprising left reference boundary samples and top reference boundary samples;
   derive a reduced predictor, wherein a process to derive the reduced predictor comprises to apply matrix multiplication on a boundary vector and to add an offset, and wherein the boundary vector is derived from the target reference boundary region; and
   if current block size is larger than reduced predictor size:
   generate an up-sampled reduced predictor having the current block size by applying horizontal and vertical bi-linear interpolation to the reduced predictor and selected left reference boundary samples and selected top reference boundary samples at specific positions; and
   encode or decode the current block using the up-sampled reduced predictor.

* * * * *